April 17, 1956     R. K. SUPER     2,742,110
BRAKE SHOE FORK
Filed June 11, 1953

INVENTOR.
RALPH K. SUPER
BY
RICHEY, WATTS, EDGERTON & McNENNY
/ATTORNEYS

United States Patent Office 2,742,110
Patented Apr. 17, 1956

2,742,110

BRAKE SHOE FORK

Ralph K. Super, Ashtabula, Ohio, assignor to Detroit Duo-Grip Brake Corporation, Detroit, Mich., a corporation of Michigan Application June 11, 1953, Serial No. 360,950

5 Claims. (Cl. 188—76)

This invention relates broadly to brakes for automotive vehicles and more specifically to improvements in the brake shoe actuating mechanism therefor.

One of the objects of the invention is to provide a fork for the pivotal support of an internal and external brake shoe and to fulcrum the fork intermediate the brake shoe pivots in a plane common to the medial axes thereof.

Another object of the invention is to provide a brake shoe support which is designed to facilitate radial floating movement of the fork relative to the flange of the brake drum in order to accommodate automatic adjustment of the shoes compensative the wear of the brake lining.

Further objects of the invention reside in the provision of a brake actuating mechanism which is efficient of operation, durable of structure, light in weight, and economic of manufacture and maintenance.

Other objects and advantages, more or less ancillary to the foregoing, and the manner in which all the various objects are realized will appear in the following description, which, considered in connection with the accompanying drawings, sets forth the preferred embodiment of the invention.

Referring to the drawings.

Figure 1:
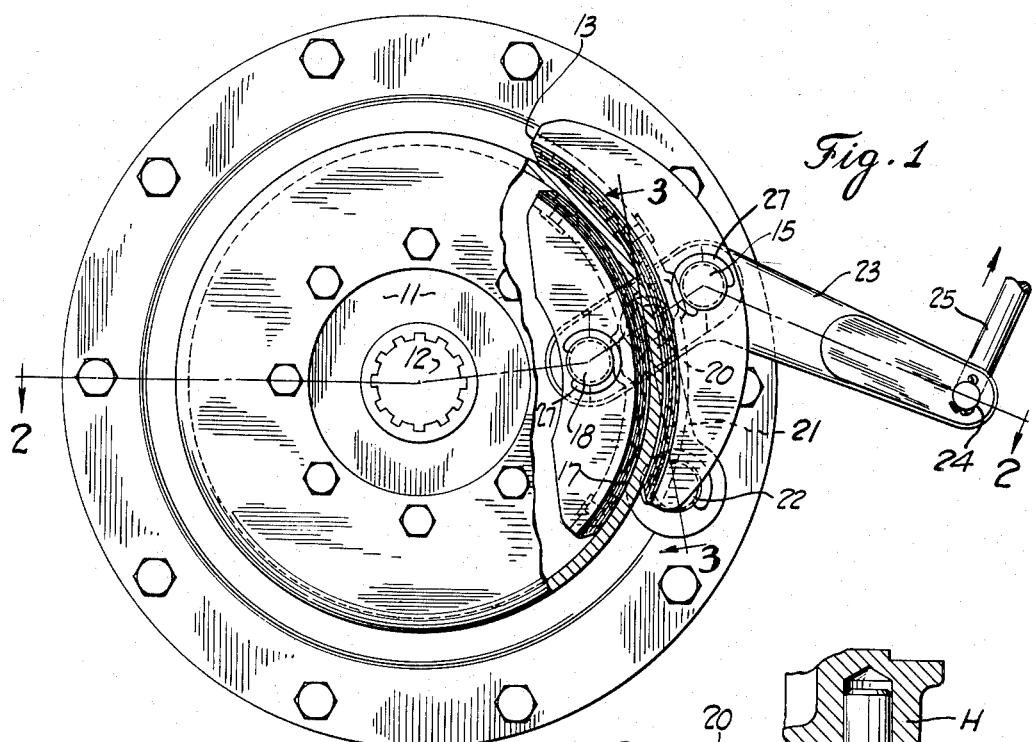
Fig. 1 is a front elevational view of a brake assembly embodying the improved actuating mechanism, a portion of the brake drum being broken away in the interest of clarity.
Figure 3:
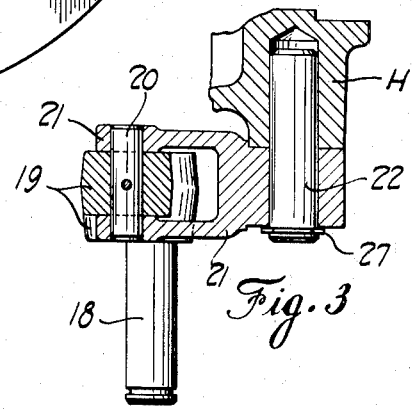
Fig. 3 is a section taken on a plane indicated by the line 3—3 in Fig. 1.
Figure 2:
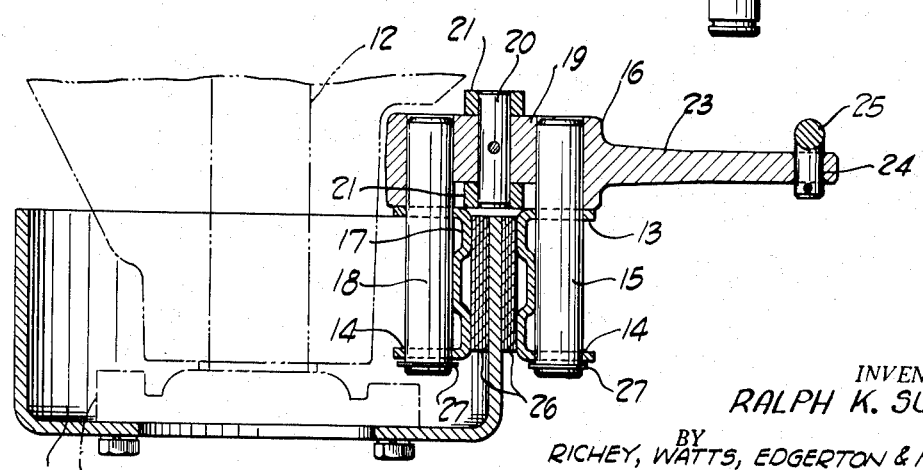
Fig. 2 is a vertical section taken on a plane indicated by the line 2—2 in Fig. 1.

Referring first to Fig. 1, the brake comprises a drum 10 mounted on a flange 11 which is broached for engagement with a splined drive shaft 12. The brake shoes as illustrated are formed from sheet steel stampings, die struck to the contour of the flanged portion of the drum and drawn with side wall flanges defining bodies of channeled transverse section. The outer brake shoe 13 is provided with aligned openings 14 in the center of the flanged portion thereof to receive a pintle 15 mounted in a brake actuating fork 16 while the inner shoe 17 which is of similar form is mounted for pivotal movement upon a second pintle 18 on the fork. The pintles which constitute the tines of the fork are disposed in stradled relation with the flanged portions of the brake drum, the central portion of the body 19 thereof being provided with a pin 20 parallel the pintles 15 and 18 and pivotally supported in a yoke 21. The lower end of the yoke is fulcrumed on a stud 22 mounted in a non-rotatable member H of the vehicle chassis adjacent the circumferential edge of the brake drum. The fork is provided with a crank arm 23 disposed at right angles to the medial axes of the pintles 15 and 18 and in oblique relation to a horizontal plane through the center thereof. The lower end of the crank arm is formed with an opening 24 therein to receive a brake pull rod 25 connected in the customary manner through linkage to a brake pedal or lever arm not shown.

In operation, the brake is applied by retraction of the pull rod 25 which effects the elevation of the crank arm 23 as indicated by the arrow in Fig. 1 and causes the rotation of the body of the fork 16 about the pin 20. As the fork rotates the pintles 15 and 18 are biased toward the brake drum flange, thus drawing the friction material or brake lining 26 into impinged relation therewith. The brake shoes and the yoke 21 are mounted for free rotational movement upon their respective journals; hence as the brake lining wears, the shoes and the body of the fork will float in self-aligned relation with the drum.

The stud 22 and the pintles 15 and 18 are machined with grooves in the outer ends thereof for the reception of snap washers 27 to facilitate the ready removal of the yoke and shoe assembly for renewal of the brake lining.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A brake comprising a brake drum, a flange thereon, a fixed anchor post adjacent the outer face of said flange, a yoke arm mounted for pivotal movement on said post, a pin in the upper end of said yoke arm, a fork fulcrumed to said pin in said yoke, pintles on said fork disposed in straddled relation with said flange of the brake drum, inner and outer brake shoes pivotally mounted on said pintles, and a crank arm on said fork for rocking the fork about said pin.

2. A brake comprising a flanged brake drum, a fixed anchor post adjacent the circumferential edge thereof, a rocker arm pivoted on said anchor post, a pin in the end of said arm, a fork pivoted on said pin, parallel pintles on said fork disposed in equi-spaced relation with said pin and in straddled relation with the flanged portion of said brake drum, brake shoes pivoted upon said pintles, and a crank arm on said fork for the actuation thereof about the pin in the rocker arm.

3. A brake comprising a brake drum, a flanged fork, tines thereon disposed in straddled relation with the flange of the brake drum, brake shoes pivoted upon said tines, a pin in said fork intermediate the tines, a rocker arm fulcrumed on said pin, a fixed post adjacent the rim of said drum pivotally connected to said rocker arm, and a crank on said fork for the oscillation thereof about said pin.

4. A brake comprising a brake drum, a stationary anchor post adjacent the rim of said drum, a rocker arm pivoted thereon, a yoke in the top of said rocker arm, a pin therein, a shoe actuating fork mounted in said yoke on said pin, parallel tines on said fork in equi-spaced relation with said pin and in a common plane with said pin, inner and outer brake shoes pivotally mounted on said tines, and a bell crank arm on said fork for rocking the fork within the yoke in said rocker arm.

5. A brake comprising a flanged drum, a fixed post adjacent the circumferential face thereof, a yoke arm pivoted at one end upon said post, a pin in the other end of said yoke arm, a fork pivoted upon said pin, pintles on said fork disposed on each side of said pin constituting the fork tines, said pintles being disposed in parallel relation with the inner and outer faces of the brake drum flange and in parallel relation with said pin and with each other, inner and outer brake shoes pivoted upon said pintles, and an arm on said fork disposed in normal relation to said pin for rotating the body of the fork about the pin.

References Cited in the file of this patent

UNITED STATES PATENTS

| | | |
|---|---|---|
| 1,936,569 | Bendix | Nov. 28, 1933 |
| 2,239,977 | Rosenberg | Apr. 29, 1941 |
| 2,654,445 | Oetzel | Oct. 6, 1953 |

FOREIGN PATENTS

| | | |
|---|---|---|
| 773,093 | France | Aug. 25, 1934 |